United States Patent
Paniconi et al.

(10) Patent No.: US 7,088,773 B2
(45) Date of Patent: Aug. 8, 2006

(54) MOTION SEGMENTATION SYSTEM WITH MULTI-FRAME HYPOTHESIS TRACKING

(75) Inventors: Marco Paniconi, Campbell, CA (US); James J. Carrig, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 532 days.

(21) Appl. No.: 10/052,699

(22) Filed: Jan. 17, 2002

(65) Prior Publication Data
US 2003/0133503 A1   Jul. 17, 2003

(51) Int. Cl.
H04H 7/18   (2006.01)

(52) U.S. Cl. .......................... 375/240.16; 375/240.25; 375/240.26

(58) Field of Classification Search .................. 375/240.11–240.29; 348/143–162; 725/105–109
See application file for complete search history.

(56) References Cited

U.S. PATENT DOCUMENTS

| | | | |
|---|---|---|---|
| 5,043,810 A | | 8/1991 | Vreeswijk et al. |
| 5,729,471 A | * | 3/1998 | Jain et al. ................... 725/131 |
| 5,778,097 A | | 7/1998 | Nickerson |
| 5,850,352 A | * | 12/1998 | Moezzi et al. ............... 345/419 |
| 5,894,526 A | | 4/1999 | Watanabe et al. |
| 5,903,672 A | | 5/1999 | Yu |
| 5,909,251 A | * | 6/1999 | Guichard et al. ........ 348/416.1 |
| 5,969,755 A | * | 10/1999 | Courtney .................... 348/143 |
| 5,991,447 A | | 11/1999 | Eifrig et al. |
| 6,157,677 A | * | 12/2000 | Martens et al. ........ 375/240.16 |
| 6,643,387 B1 | * | 11/2003 | Sethuraman et al. ........ 382/107 |

OTHER PUBLICATIONS

Philippe Robert, Motion compensating interpolation considering occluding, appearing and disappearing areas, Signal Processing of HDTV III, Proceedings of the Fourth International Workshop on HDTV and beyond, Turin, Italy, Sep. 4-6, 1991, pp. 329-341.

Wang et al., Representing Moving Images with Layers, IEEE Transactions on Image Processing Special Issue: Image Sequence Compression, vol. 3, No. 5, pp. 1-13, Sep. 1994.

(Continued)

*Primary Examiner*—Andy Rao
(74) *Attorney, Agent, or Firm*—Blakely, Sokoloff, Taylor & Zafman LLP

(57) ABSTRACT

In one embodiment, a video encoder encodes digital video using motion segmentation. According to one embodiment, motion segmentation is performed using multiple frames. The motion segmentation may operate by determining multiple classification hypotheses and by re-classifying poorly classified regions according to the multi-frame hypothesis tracking algorithm. This involves determining a similarity measure for each hypothesis class, and then assigning a classification to the region with the hypothesis class that is most similar or consistent with past or future data. This hypothesis tracking algorithm for re-classification can handle inherent problems like occlusion and ambiguous motion classification, that plague standard methods. In another embodiment, the motion segmentation algorithm may be integrated into a larger video encoding system. The system may incorporate motion estimation, motion classification, identification and selection of poor blocks, and re-classification of poor blocks using the multi-frame hypothesis tracking algorithm.

21 Claims, 7 Drawing Sheets

OTHER PUBLICATIONS

Borshukov et al., Motion Segmentation by Multi-Stage Affine Classification, Department of Electrical Engineering and Center for Electronic Imaging Systems, pp. 1-11.

Yair Weiss, Smoothness in Layers: Motion segmentation using nonparametric mixture extimation, CVPR 97, pp. 520-527, Puerto Rico.

Bergen et al., Dynamic Multiple-Motion Computation, David Sarnoff Research Center, Artifical Intellligence and Computer Vision, 1991, pp. 147-156.

Zhang et al., Image Sequence Coding using Multiple-Level Segmentation and Affine Motion Estimation, IEEE J. on selected areas in communications, vol. 15, No. 9, 1997, pp. 1704-1713.

Chang et al., Simultaneous Motion Estimation and Segmentation, IEEE Trans. Image Processing, vol. 6, No. 9, Sep. 1997, pp. 1326-1333.

Zhang et al., Image Sequence Segmentation Usign 3D-Structure Tensor and Curve Evolution, IEEE Trans. on Circuits and Systems for Video Technology, vol. 11, No. 5, 2001, pp. 629-641.

Mansouri et al., Motion Segmentation with Level Sets, Proc. SPIE, vol. 3974, Image and Video Communications and Processes 2000, pp. 584-595.

Leymarie et al., Tracking Deformable Objects in the Plane Using an Active Contour Model, IEEE Trans. on Pattern Analysis and Machine Intelligence, vol. 15, No. 6, Jun. 1983, pp. 617-634.

Reshef et al., Low Bit-Rate Video Coding Using Iterative Affine Motion Estimation and Quadtree Segmentation, Proc. Int'l Conf. on Digital Signal Processing—DSP95, Limasol, Cyprus, Jun. 1995, pp. 427-431.

* cited by examiner

MOTION SEGMENTATION SYSTEM WITH MULTI-FRAME HYPOTHESIS TRACKING

FIELD OF THE INVENTION

The present invention relates to encoding digital video. More specifically, the present invention relates to a more effective method of motion segmentation.

RELATED ART

Digitally encoded video is typically compressed because video can require an enormous amount of digital storage if left uncompressed. Digital video can be compressed using a method known as motion estimation. Motion estimation compresses video by relating one frame of video to other frames in a sequence. Because there tends to be little difference between one frame and a succeeding frame in a video sequence, a video encoder can determine the differences between the two frames and encode the second frame using what are known as motion vectors. In other words, the first frame can be coded as an entire image, and the second frame can refer to the first image using motion vectors to show which portions of the first frame have changed in the second frame. Because a frame encoded using motion estimation requires much less data storage than a fully encoded frame, the size of a video sequence can be greatly reduced.

Another related method of compressing digital video is motion segmentation. Motion segmentation involves identifying separate classes of motion in a frame or sequence of frames. A class of motion may refer to a single moving object. Once the individual classes in a frame are identified, an encoder can use vectors to track the objects from frame to frame. For example, in a first frame, an encoder may detect a specific object inside that frame and assign that object to a motion class. The encoder can then encode that object, and in a subsequent frame, the encoder can refer to the object in the previous frame where it was fully encoded. The encoder can then use a vector to indicate the location of the previously encoded object in the new frame. Because the encoder only has to fully encode the image in the first frame, the amount of data required to be encoded is greatly reduced.

Several methods of motion segmentation currently exist. Common methods are Dominant Motion Analysis, clustering, and Bayesian-type/estimation maximization methods. With all of these methods, a single frame is used for segmentation. That is, when using motion segmentation to encode a frame, the frame being encoded refers only to the frame immediately preceding it.

All of these standard methods can lead to problems such as holes or gaps formed in moving objects, as well as problems arising from misclassification due to occlusion. Occlusion refers to a situation where one object is in front of another object. When dealing with objects that are occluded, the encoder has difficulty distinguishing one object from another.

SUMMARY OF THE INVENTION

In one embodiment, a video encoder encodes digital video using motion segmentation. According to one embodiment, motion segmentation is performed using a new multi-frame hypothesis tracking algorithm. The algorithm may operate by determining multiple classification hypotheses for a potentially poorly classified region. The region may be re-classified by the classification hypothesis that is most similar or consistent with information across multiple frames. This motion segmentation system with hypothesis tracking over multiple frames is effective at handling limitations and problems, like occlusion and ambiguous classification, that plague standard methods.

In another embodiment, the motion segmentation algorithm may be integrated into a larger video encoding system. The system may incorporate motion estimation, motion classification, identification of poorly classified blocks or regions, and re-classification of poorly classified blocks using a hypothesis tracking algorithm across multiple frames.

DETAILED DESCRIPTION

The present invention relates to devices and methods for efficiently encoding digital video.

Figure 1A:
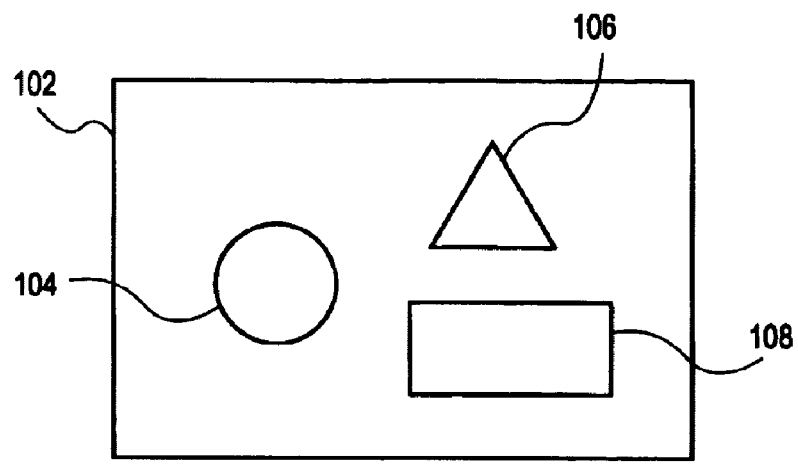
FIG. 1a illustrates a frame having objects according to one embodiment.

FIG. 1a illustrates a frame having objects according to one embodiment. Methods for motion segmentation can divide a frame containing an image in a video sequence into a number of classes. For example, frame 102 has three moving objects, object 104, object 106, and object 108. An encoder could assign the region defining each moving object 104, 106, and 108 to its own class. The class can then be tracked from frame to frame using vectors rather than encoding the entire object in each frame. In this way, a great deal of processing and data storage can be saved because the object need only be encoded.

Figure 1B:
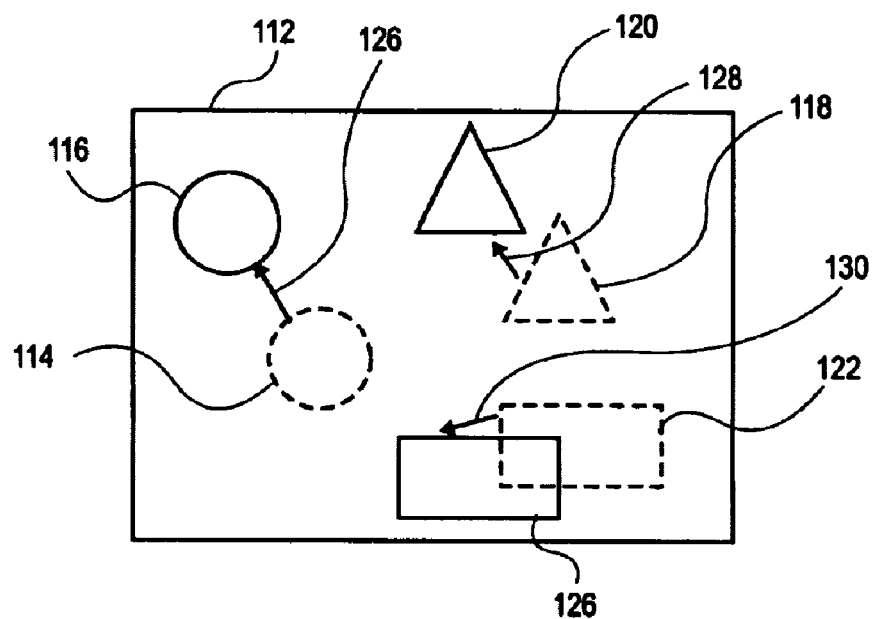
FIG. 1b illustrates a frame having moving objects according to one embodiment.

FIG. 1b illustrates a frame having moving objects according to one embodiment. Frame 112 is the frame subsequent to frame 102. Object 114 corresponds to object 104 of FIG. 1a. Object 114 is drawn using dashed lines to indicate that it is the location of the object as it was in the previous frame 102. Object 116 is the current location of the object in this frame 112. Similarly, object 118 corresponds to object 106 of frame 102, and object 120 is the current location of the object, and object 122 corresponds to object 108 in frame 102, and object 124 is the current location of the object. A code vector associates a class of the current frame with a class of the previous frame, so that a decoder knows the movement of the class. In frame 112, there are three code vectors 126, 128, and 130. Because in this example, each object has its own class, and because a class can be referenced to only by its code vector, rather than having to entirely encode the image in every frame, a significant amount of data storage savings is realized.

Figure 1C:
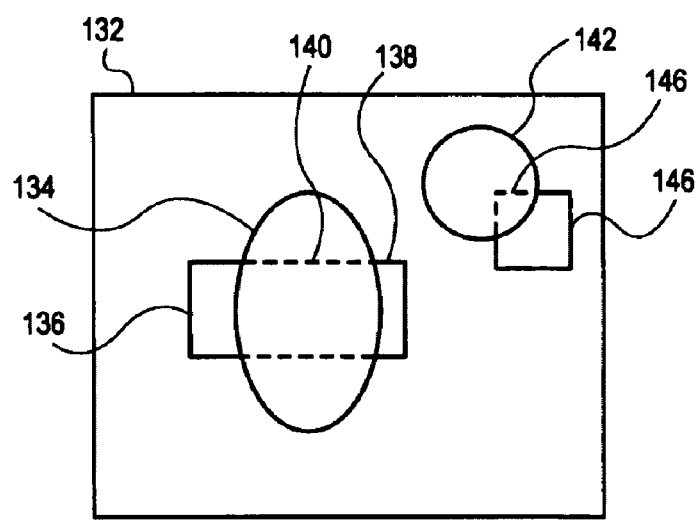
FIG. 1c illustrates a video frame having occluded objects.

FIG. 1c illustrates a video frame having occluded objects. Frame 132 has four different objects that may be represented by four different classes. Object 134 occludes object 136, that is object 134 partially blocks object 136. Objects 136 and 138 are actually both parts of the same object. Dashed lines 140 indicate the portion of objects 136 and 138 which are not visible in frame 132. Likewise, object 142 occludes object 144, with dashed lines 146 indicating the occluded portion of object 144.

A shortcoming of prior art methods is that they consider only the previous frame when determining classifications for the current frame. In the case of frames containing occluded objects, this can be especially troublesome. For example, an encoder may consider objects 136 and 138 to be separate objects, and classify them separately, even though they should be members of a single class. If object 134 moves away and objects 136 and 138 remain in their place, objects 136 and 138 will once again be visible as a single object, and will be classified as such. However, this may not be apparent in the previous frame. By using both previous and future frames, and by using hypothesis racking across multiple frames to effect re-classifications, the problem of occlusion can be significantly mitigated.

Figure 2:
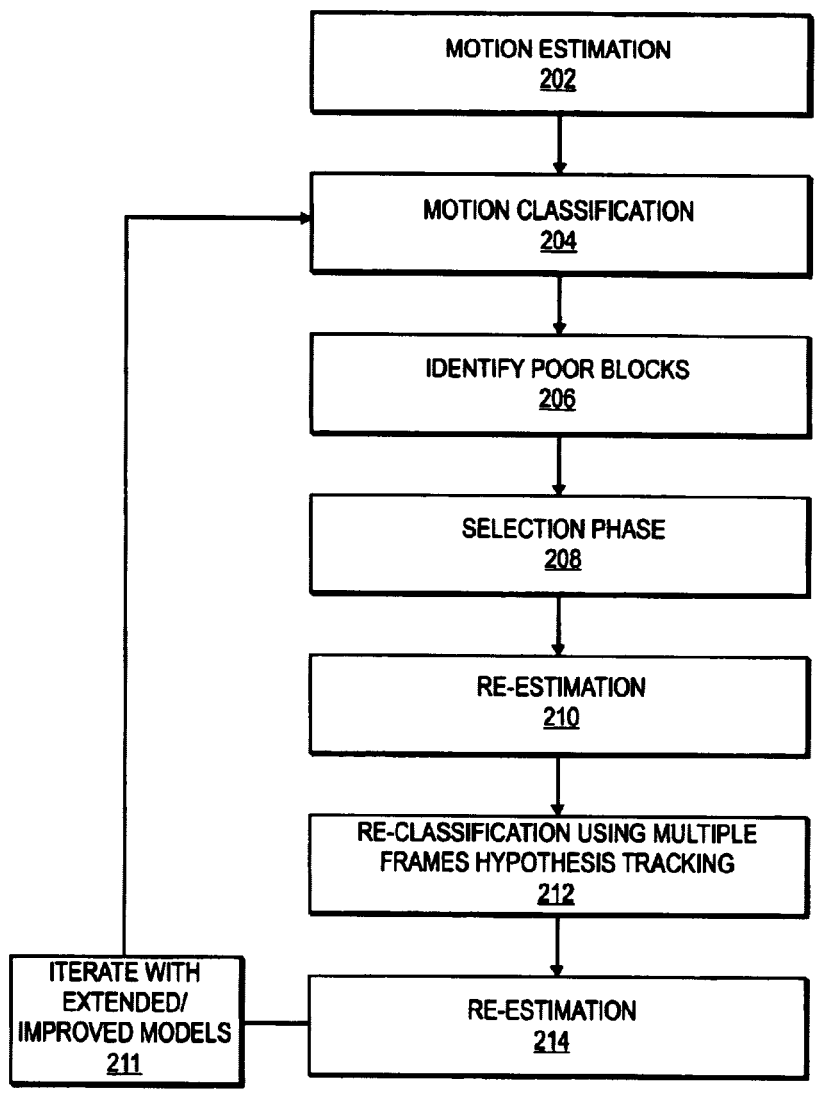
FIG. 2 is a flow diagram illustrating the process of a video encoder according to one embodiment.

FIG. 2 is a flow diagram illustrating the process of a motion segmentation system according to one embodiment. The process illustrated in FIG. 2 includes motion estimation, motion classification, identification of poorly classified blocks and/or regions, and re-classification using a multi-frame hypothesis tracking algorithm and motion segmentation.

At block 202, motion estimation is performed. As described above, motion estimation can track the movement of blocks of one frame to another frame using motion vectors. Motion estimation can be performed for each block using a parametric model, such as the six parameter affine model, or an eight parameter perspective model. For purposes of illustration, the affine model will be used. The affine model can be described by two equations:

$$i' = ai + bj + c$$

$$j' = di + ej + f$$

The parameters i and j describe the location of a pixel in the current frame, i' and j' describe the location of the pixels in the previous frame, and a, b, c, d, e, and f are motion model parameters. A motion vector, which describes the motion of a block between two frames, can be denoted as the vector v=(a, b, c, d, e, f).

To improve the accuracy of a motion vector, an encoder can minimize the prediction error of the motion vectors using, for example, a gradient descent method. The prediction error is a measurement of how accurate the motion vectors will be.

In block 204, the encoder performs motion classification. A variety of processes may be used. In one embodiment, the encoder may use a process known as K-means clustering to classify the local motion models into a number of classes. Local motion models typically indicate a moving object, as explained above. Each object can define a class. Each class can have a code vector that defines the movement of the class to and from other frames. For further information on K-means clustering, see "Motion Segmentation by Multi-Stage Affine Classification", Institute of Electrical and Electronic Engineering Trans. Image Proc., vol. 6, no. 11, pp. 1591–1594. Nov. 1997, Borshukov, et al.

Classification distortion is a measurement of distortion for a specific class. As such, it is a measurement of the quality of a specific classification. In one embodiment, distortion can be determined using the following equation:

$$D = sx(a-K^1)^2 + sy(b-K^2)^2 + (c-K^3)^2 + sx(d-K^4)^2 + sy(e-K^5)^2 + (f-K^6)^2$$

Other equations may also be used.

In the above equation K is the code vector, and $K^j$ (j=1–6) are the components of the code vector, sx and sy are scale factors equal to the length of the image in the x and y directions. When encoding, the code vectors can be reanalyzed and redetermined until the total distortion does not change.

In one embodiment of the above disclosed process there are a fixed number of classes used, for example, three to five total classes, may be sufficient. Further, the algorithm may include a few extra calculations to simplify the process. For example, a global estimate may be chosen as one of the sets of code vectors so that a dominant background motion will be chosen as a class. Also, if two classes have code vectors that are very similar, the two classes can be merged into one.

At block 206, the encoder identifies poorly classified blocks. A poorly classified block is a block or region of pixels that has been identified as belonging to an improper class. For example, one region of one object may be identified as belonging to a class identifying another object. If one object has two different code vectors identifying different motion, then naturally problems will arise when the poorly classified region of the object is instructed to move with another object.

Poorly classified regions can be identified by examining two measurements: the prediction error and the distortion of a region. If a region has a high prediction error or distortion compared to a threshold, then it can be said to be poorly classified. A set of thresholds may be predetermined, for example, a threshold may be set where any region having a distortion measure greater than the threshold can be said to be poorly classified. One threshold may be set for the distortion measure, and one may be set for the prediction error. In the following discussion, $T_1$ is the threshold used with the prediction error and $T_2$ is the threshold used with the distortion measure.

The following equation may be used to determine the local prediction error for the region i:

$$e_i > \bar{e} + T_1 e_{rms}$$

where $e_i$ is the local prediction error of region i, e is the average prediction error over the entire frame, and $e_{rms}$ is the root mean square deviation over the entire frame. Here, if the local prediction error is greater than the right hand side of the equation, the region can be said to be poorly classified. Likewise, the equation $D_i > \bar{D} + T_2 D_{rms}$ can be used to determine whether the distortion level of the region is high, and thus the region is poorly classified. Here, $D_i$ is the distortion of the region i, D is the average distortion over the entire frame, and $D_{rms}$ is the root mean square deviation over the entire frame. Other equations providing similar functionalities may be used to determine the local prediction error and distortion level of the region.

At block 208, the selection phase is executed. During the selection phase, an encoder can re-classify poorly classified regions according to their local minimum prediction error. In one embodiment, a class may be chosen according to the following equation: $C^i = \arg \min_j e^i(K_j)$.

Here, $e^i(K_j)$ is the local prediction error for block i having motion vector $K_j$.

At block 210, the motion models are re-estimated within their respective classes. In one embodiment, this is done using a gradient descent method. Other re-estimation techniques may be used. The re-estimation step can lead to an improved motion model with lower prediction error.

At block 212, the encoder performs re-classification using the multi-frame hypothesis tracking algorithm. One embodiment of this process is described with respect to FIG. 3.

At block 214, the re-estimation in block 210 is performed again using the new segmentation field found during re-classification using multiple frames in block 212.

At block 216, the process may be repeated for a specific region or frame using different parameters or different motion model.

Figure 3:
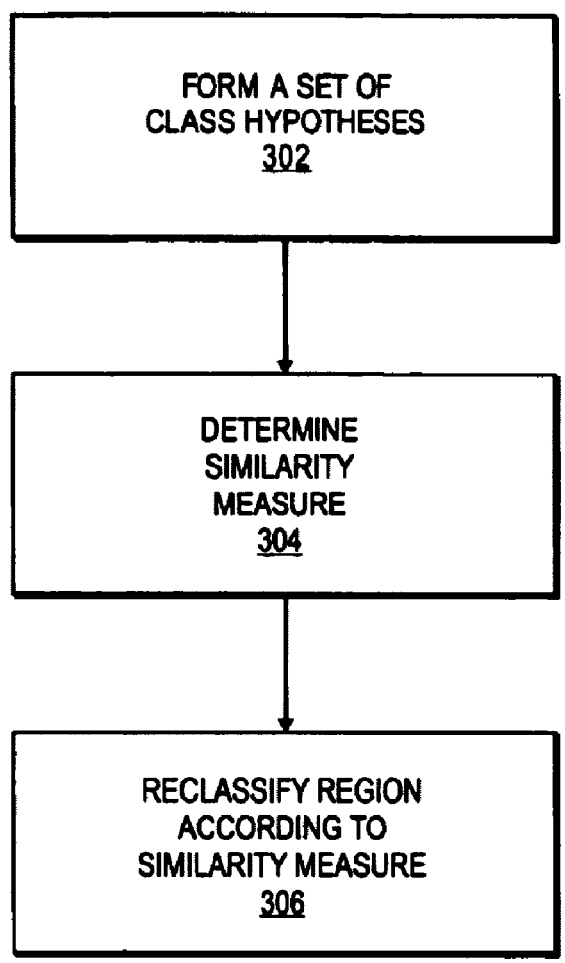
FIG. 3 is a flow diagram illustrating the process of reclassification using motion segmentation with the multi-frame hypothesis tracking.

FIG. 3 is a flow diagram illustrating the process of re-classification using the multi-frame hypothesis tracking algorithm. In block 302, the system forms a set of class hypotheses for a poorly classified region. The set of class hypotheses is a set of possible classifications for the poorly classified region. Once all possible classifications have been determined, at block 304 similarity measures are determined. A similarity measure is a measure of similarity/consistency between the hypothetical class for the poorly classified region and its corresponding class on past and/or future frames. The smaller the similarity measure, the more consistent or similar the hypothetical class is with its corresponding region in past and future frames. According to one embodiment, the similarity measure A may be determined using the following equations. The following equation determines the similarity measure for a hypothetical class (of a poorly classified region) to the class of the corresponding regions on future frames.

$$A_{future}(K_i) = \frac{1}{N} \sum_{t>s} \sum_{\vec{x} \in B_j^s} D(K_t^f(\vec{x}), K_i)$$

Similarly, the following equation determines the similarity of a hypothetical class to the class of the corresponding region on past frames.

$$A_{past}(K_i) = \frac{1}{N} \sum_{t<s} \sum_{\vec{x} \in B_j^s} D(K_t^p(\vec{x}, K_i), K_i)$$

The similarity measure A may be determined for classes having hypothetical code vectors $K_i$, i=1 ... N. In the above equations, N refers to a normalization factor which is the total number of distortion computations (which is the total number of pixels in the block and the number of frames used in the hypotheses), x is a pixel location, and D is a distortion measure as defined above.

$$K_t^{p/f}$$

are the code vectors for the region in the past and future frames. $B_j^s$ refers to the poorly classified region in a frame s. t>s refers to a time subsequent to s (hence, frames after frame s), and likewise t<s refers to frames before frame s. The summations above are summing over all pixels in a poorly classified region and over a specified number of frames, either before or after frame s. The number of frames used either before or after a current frame may be determined for each encoder. Referencing to more frames will require more processing; however, the more frames that are referenced, the more accurate the classification. In the above equations, one frame is reference before frame s, and one frame is referenced after s. The similarity measure A indicates that a hypothesis is more similar to the poorly classified region when A is smaller.

The code vectors for the corresponding region for the past and future frames, i.e., the quantities $$K_t^{p/f},$$

may be obtained as follows. For the past/backward tracking, the pixels in block $B_j^s$ are mapped to corresponding pixels in the previous frame based on its hypothetical code vector. The code vector $K_i$ determines the motion model, and so a mapping $T_{s,t}(\vec{x} \in B_j^s)$ determines the corresponding set of pixels on the previous frame. This mapping is obtained from the motion model (for, say, the affine motion model):

$$i'=ai+bj+c$$

$$j'=di+ej+f$$

Here (i', j')= $\vec{x}$' are the corresponding pixels on the previous frame t=s-1, $\vec{x}$ =(i, j) the pixels on current frame s in block $B_j^s$, and the motion model parameters are that of the hypothetical motion/code vector $K_i$ for block $B_j^s$. The quantity $$K_{t=s-1}^p(\vec{x}, K_i)$$

is then the motion vector from frame s-1 for the corresponding pixel $\vec{x}$'; i.e., $$K_{t=s-1}^p(\vec{x} K_i) = K(\vec{x}').$$

For frames deeper in the past, the procedure and the mapping is applied successively; for example, for t=s-2, $T_{s,t}=T_{s-1,s-2}T_{s,s-1}$.

For the future or forward tracking, consider the next/future frame s+1. We first locate the set of pixels on frame s+1 that are derived (via the motion model) from pixels in block $B_j^s$ at time s. That is, we consider the set S of pixels on frame s+1 that map to $B_j^s$ under the motion, i.e., S=({i', j'}|$T_{s+1,s}$(i', j')∈$B_j^s$). The corresponding block on the future frame s+1 used in the similarity measure is the motion block B' which contains most of the pixels from the set S. The quantity $$K_{t=s+1}^f(\vec{x})$$

is then the motion vector from frame s+1 for the block B', i.e., $$K_{t=s+1}^{f}(\vec{x}) = K(B').$$

For frames deeper in the future, the same procedure is repeated sequentially.

After determining the similarity measures for all possible class hypotheses, the encoder determines which of the similarity measures is the smallest, and thus, which class is most suitable for the poorly classified region. The class hypothesis similarity measure is determined from the minimum of the past and future frame similarity measures: $A(K_i) = \min(A_{past}(K_i), A_{future}(K_i))$, where $K_i$ is a class hypothesis. The poorly classified region can then be reclassified according to the minimum over all possible hypotheses: selected class (C) is: $C = \arg\min_i(A(K_i))$, where the index i labels the possible hypothetical classes.

At block 306, the region is reclassified according to the similarity measure. Using the above equation to determine which similarity measure is the smallest, corresponding to the smallest similarity measure, can then be assigned to the region. In this way, the region is then assigned to the appropriate class. This class is appropriate because it has been determined that it is the class most similar or consistent with the corresponding past and future frame data.

Figure 4:
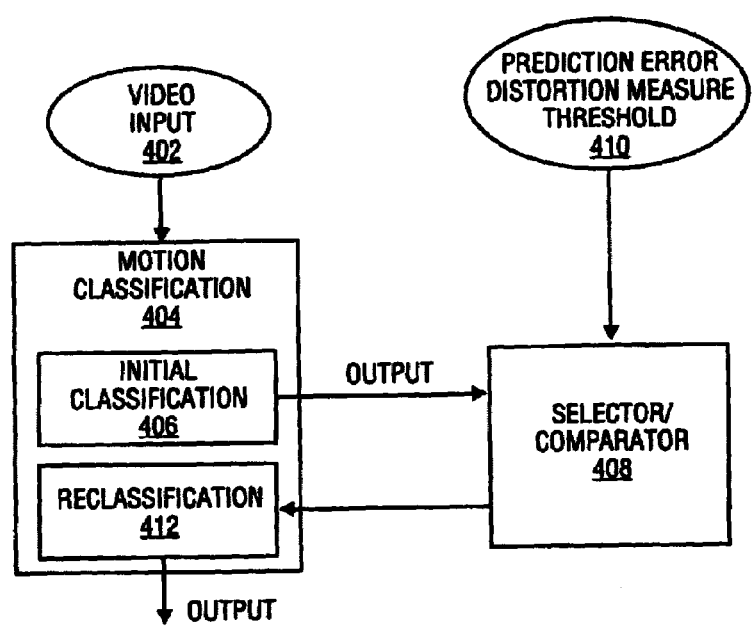
FIG. 4 illustrates a video encoder and associated hardware according to one embodiment.

FIG. 4 illustrates a video encoder and associated hardware according to one embodiment. Encoder 400 receives video input 402 and outputs digitally encoded video. Input 402 streams video frames into the motion classifier 404. Motion classifier 404 has an initial classification component 406. Frames from input 402 are inputted into the initial classifier 406 and are classified according to a classification algorithm. The output from initial classifier 406 is sent to selector/comparator 408. Selector/comparator 408 uses prediction error distortion measure and threshold 410 to determine whether or not output from initial output classifier 406 is poorly classified. Output from selector/comparator 408 is then sent back to reclassifier 412. Reclassifier 412 takes poorly classified regions identified by selector/comparator 408 and reclassifies them according to the hypothesis tracking reclassification algorithm as explained above. Reclassifier 412 then outputs the data for use elsewhere in the system.

Figure 5:
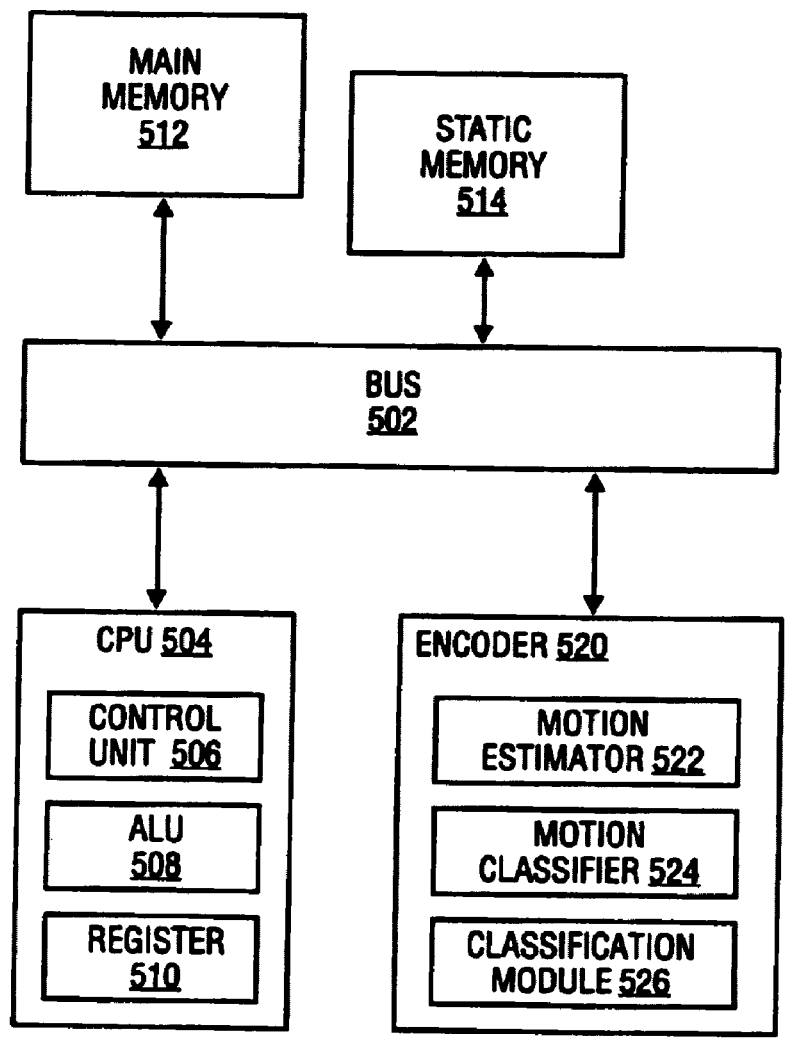
FIG. 5 illustrates a video encoder according to another embodiment.

FIG. 5 illustrates a video encoder according to another embodiment. For one embodiment, a video encoding device may be implemented using a general processing architecture. Referring to FIG. 5, the system may include a bus 502, or other communications means for communicating information, and a central processing unit (CPU) 504 coupled to the bus for processing information. CPU 504 includes a control unit 506, an arithmetic logic unit (ALU) 508 and registers 510. CPU 504 can be used to implement the video encoder and decoder. The processing system 500 also includes a main memory 512, which may be a random access memory (RAM) device that is coupled to the bus 502. The main memory stores information and instructions to be executed by CPU 504. Main memory 512 may also store temporary variables and other intermediate information during the execution of instructions by CPU 504. The system 600 also includes a static memory 514, for example, a read-only memory (ROM), and/or other static device that is coupled to the bus 502 for storing static information and instructions for CPU 504. The CPU 504 may execute code or instructions stored within a computer-readable medium (e.g., main memory 512) that may also be included within the video encoder system.

The computer-readable medium may include a mechanism that provides (i.e., stores and/or transmits) information in a form readable by a machine such as a computer or digital processing device. For example, a computer-readable medium may include a read only memory (ROM), random access memory (RAM), magnetic disk storage media, optical storage media, flash memory devices. The code or instructions may be represented by carrier-wave signals, infrared signals, digital signals, and by other like signals.

The encoder 520 is coupled to the bus 502 and configured to encode digital video. The encoder 520 includes a motion estimator 522 to perform motion estimation as described above. The encoder 520 further includes a motion classifier 524 to perform motion segmentation as described above. Encoder 520 also includes a reclassification module to reclassify poorly classified blocks. The encoder may, in one embodiment, operate in a manner as explained with respect to the flow diagram in FIG. 2.

Figure 6A:
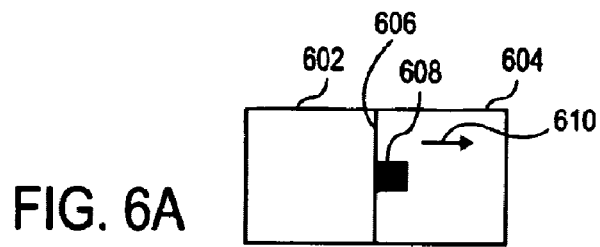
FIGS. 6a, 6b, 6c, 6d, 6e and 6f illustrate a set of frames undergoing an example of motion segmentation using the multi-frame hypothesis tracking algorithm.

FIGS. 6a, 6b, 6c, 6d, 6e and 6f illustrate a set of frames undergoing an example of motion segmentation using multi-frame hypothesis tracking. FIG. 6a illustrates a situation which would be poorly classified using a single frame method. Frame 601 has two regions, region 602 and region 604. Vertical boundary 606 divides the two. Block 608 is a region of a frame which may be assigned its own class. Arrow 610 indicates the motion of region 604. Region 602 is stationary.

Figure 6B:
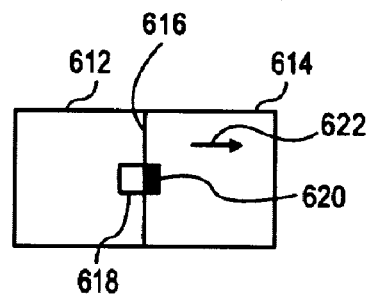

FIG. 6b illustrates a frame 611 that is the frame prior to frame 601. As such, frame 611 has region 612 and region 614 as well as vertical boundary 616. Motion block 618 is now partially in region 612 and partially in region 614. The visible portion of block 618 is visible portion 620. Again, arrow 622 indicates the direction of region 614. Invisible portion 619 indicates and area of the block 618 that is not visible. This is because region 612 is a stationary region while region 614 is a moving region. Region 612 overlays a portion of block 618, thus making it invisible. As a result, when transitioning from frame 601 to frame 611 there is a great deal of occlusion which will likely result in a high prediction error and poor classification.

Figure 6C:
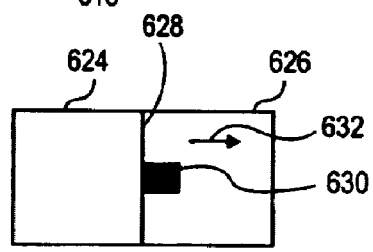
Figure 6D:
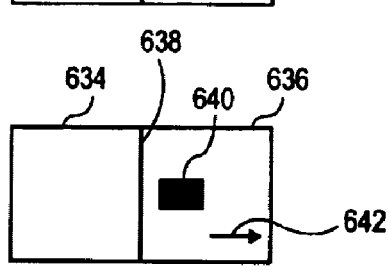
Figure 6E:
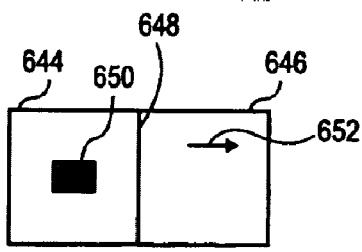
Figure 6F:
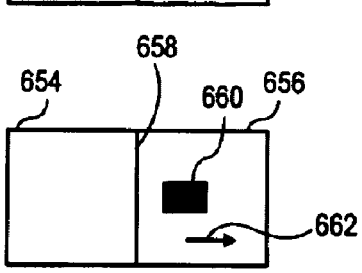

FIGS. 6c, 6d, 6e and 6f illustrate different hypotheses for possible classifications of the poorly classified region. In FIGS. 6c and 6d, a hypothesis is used wherein the block is considered to be a member of the class having a code vector with a velocity of zero. In FIGS. 6e and 6f the block is considered to be a member of a class having a code vector with a velocity equaling the velocity of the motion of the right hand side of the frame. FIGS. 6c and 6e refer to the previous frame, while FIGS. 6d and 6f refer to the subsequent frame.

In the case of FIG. 6c, we use the hypothesis that the block 608 in FIG. 6a has the hypothesis class of velocity zero. This class hypothesis allows us to backtrack and find the corresponding region in the previous frame. This region is block 630 in FIG. 6c. With this information, the encoder can now determine a similarity measure for a frame preceding the current frame and for a class having a velocity of zero. This measure is computed using the above equation discussed in paragraph 0037. Since the corresponding region (block 630 in FIG. 6c) in the previous frame will likely be a poorly classified region (because of occlusion as discussed above), the measure A will be quite large. Therefore the hypothesis will likely not be consistent with past frame data, and thus be rejected.

The frame 633 in FIG. 6d also uses a hypothesis that the class has a velocity equal to zero. However, frame 633 is the subsequent frame, and the region in the future frame that corresponds to the original block on current frame (block 608 in FIG. 6a) is the block 640. This region has velocity equal to $V_0$ (motion of the right half of the frame). Thus, the similarity measure can be determined using the above equation, with the result:

$$A_{future} = (V_{hyp} - V_0)^2 = (V_0)^2$$

As can be seen, the result is that the similarity measure for a future frame with a velocity of zero is approximately equal to the velocity of the motion of the right half of the frame squared.

In FIG. 6e, frame 643 refers to the frame preceding the current frame. In this case, we use the hypothesis class of velocity $V_0$ for the block 608 in FIG. 6a. The corresponding region in the previous frame (obtained by backtracking according to the hypothetical class motion $V_0$) is the block 650 in frame 643. The corresponding region in previous frame (block 650) will have stationary motion, so the similarity measure for this hypothesis can be found using the equation in paragraph 0037, giving the following result:

$$A_{past} = (V_{hyp} - 0)^2 = (V_0)^2$$

FIG. 6f illustrates a frame subsequent to the current frame, and the region that corresponds to the block 608 in FIG. 6a is the block 660. As in the case of FIG. 6d, this region has velocity equal to $V_0$. However, the similarity measure for the hypothesis that block 608 has velocity $V_0$ will be very small or zero. The measure for this hypothesis can be determined using the above equation and gives the following result:

$$A_{future} = (V_{hyp} - V_0)^2 \sim 0$$

As can be seen, the result is that the similarity measure is roughly equal to zero. Because the similarity measure is so small, and is in fact the smallest of all of the hypotheses, the hypothesis represented in FIG. 6f, namely a class having a velocity equal to the velocity of the right hand side of the frame is the proper classification for the block. Therefore, the encoder would assign this class to the block.

The invention has been described in conjunction with several embodiments. It is evident that numerous alternatives, modifications, variations, and uses will be apparent to one skilled in the art in light of the forgoing description.

What is claimed is:

1. A method comprising:
   identifying a plurality of motion classes for a frame of video data, each motion class having at least one region classified thereto, wherein a region is poorly classified if it is classified as belonging to an improper class;
   determining a region to be a poorly classified region;
   forming a set of class hypotheses for the poorly classified region, the set of class hypotheses containing at least one possible motion class;
   determining a similarity measure for the poorly classified region with respect to a set of past and future video data, the similarity measure indicating a degree of consistency between a hypothesis for the motion of the poorly classified region and the motion of the corresponding regions in past and future frames; and
   reclassifying the poorly classified region to one of the at least one possible motion classes according to the similarity measure.

2. The method of claim 1, wherein the set of past and future video data comprises:
   at least one preceding frame of video data; and
   at least one succeeding frame of video data.

3. The method of claim 1, wherein reclassifying according to the similarity measure includes:
   determining which of the at least one possible motion classes are suitable for the poorly classified region using the similarity measure.

4. The method of claim 3 wherein reclassifying further includes:
   assigning the poorly classified region to a motion class of the at least one possible motion class with an optimal similarity measure.

5. The method of claim 4, wherein the optimal similarity measure is a minimum similarity measure.

6. The method of claim 1, wherein determining a region to be a poorly classified region comprises:
   measuring the distortion of a region;
   comparing the measured distortion of the region to a distortion threshold; and
   determining the region to be poorly classified if the measured prediction is greater than the prediction error threshold.

7. The method of claim 1, wherein determining a region to be a poorly classified region comprises:
   measuring the prediction error of a region;
   comparing the measured prediction error of the region to a prediction error threshold; and
   determining the region to be poorly classified if the measured prediction is greater than the prediction error threshold.

8. The method of claim 1, wherein the reclassification of a poorly classified region in an image comprises finding the minimum of a measure over all class hypotheses according to the equations arg $\min_i(A(K_i))$, where $K_i$ is a class hypothesis, indexed by i, $$A(K_i) = \min(A_{past}(K_i), A_{past}(K_i)), A_{past/future} = \frac{1}{N} \sum_t \sum_B D(K_t^{p/f}, K_i);$$

$A_{past/future}$ is a measure of the consistency through the distortion quantity, D, between a hypothetical class $K_i$ and its corresponding class $K^{p/f}$ on past/future frames.

9. A computer-readable medium comprising computer program instructions which, when executed by a processor, cause the processor to perform a hypothesis algorithm comprising:
   identifying a plurality of motion classes for a frame of video data, each motion class having at least one region classified thereto, wherein a region is poorly classified if it is classified as belonging to an improper class;
   determining a region to be a poorly classified region;
   forming a set of class hypotheses for the poorly classified region, the set of class hypotheses containing at least one possible motion class;
   determining a similarity measure for the poorly classified region with respect to a set of past and future video data, the similarity measure indicating a degree of consistency between a hypothesis for the motion of the poorly classified region and the motion of the corresponding regions in past and future frames; and
   reclassifying the poorly classified region to one of the at least one possible motion classes according to the similarity measure.

10. The computer-readable medium of claim 9, wherein the set of past and future video data comprises:
   at least one preceding frame of video data; and
   at least one succeeding frame of video data.

11. The computer-readable medium of claim 9, wherein determining a region to be a poorly classified region comprises:
   measuring the distortion of a region;
   comparing the measured distortion of the region to a distortion threshold; and
   determining the region to be poorly classified if the measured prediction is greater than the prediction error threshold.

12. The computer-readable medium of claim 9, wherein determining a region to be a poorly classified region comprises:
   measuring the prediction error of a region;
   comparing the measured prediction error of the region to a prediction error threshold; and
   determining the region to be poorly classified if the measured prediction is greater than the prediction error threshold.

13. A video device comprising:
   means for forming a set of class hypotheses for a region of a frame of video data;
   means for determining a similarity measure for the region with respect to a set of past and future video data; and
   means for reclassifying the region according to the similarity measure if the region has been poorly classified as belonging to an improper class.

14. The video device of claim 13, wherein the set of past and future data comprises:
   at least one preceding frame of video data; and
   at least one succeeding frame of video data.

15. The video device of claim 13, further comprising:
   means for determining a region to be poorly classified by a) measuring the distortion of a region, b) comparing the measured distortion of the region to a distortion threshold, and c) determining the region to be poorly classified if the measured prediction is greater than the prediction error threshold.

16. The video device of claim 13, further comprising:
   means for determining a region to be poorly classified by a) measuring the prediction error of a region, b) comparing the measured prediction error of the region to a prediction error threshold, and c) determining the region to be poorly classified if the measured prediction is greater than the prediction error threshold.

17. A video device comprising:
   a motion compensation component configured to form a set of class hypotheses for a region of a frame of video data, to determine a similarity measure for the region with respect to a set of past and future data, and to reclassify the region according to the similarity measure if the region has been poorly classified as belonging to an improper class.

18. The video device of claim 17, wherein the set of past and future data comprises:
   at least one preceding frame of video data; and
   at least one succeeding frame of video data.

19. The video device of claim 17, wherein the region is reclassified by finding the minimum similarity measure and assigning the region to a class having the minimum similarity measure.

20. A method comprising:
   performing motion estimation for a frame containing a plurality of motion classes, each motion class having at least one region classified thereto, wherein a region is poorly classified if it is identified as belonging to an improper class;
   identifying at least one poorly classified region;
selecting a new motion class for each poorly classified region;
   reclassifying the poorly classified region to the new motion class; and
   re-estimating the poorly classified region based on a result of reclassifying the poorly classified region.

21. The method of claim 20 wherein reclassifying includes:
   using a set of past and future data according to a hypothesis tracking algorithm.

* * * * *